United States Patent [19]
Townsend

[11] 3,848,083

[45] Nov. 12, 1974

[54] STAGGERED SCAN FACSIMILE

[75] Inventor: Stephen E. Townsend, Rochester, N.Y.

[73] Assignee: Xerox Corporation, Rochester, N.Y.

[22] Filed: Dec. 18, 1972

[21] Appl. No.: 316,309

Related U.S. Application Data

[63] Continuation of Ser. No. 423,061, Jan. 4, 1965, abandoned.

[52] U.S. Cl. ................................ 178/6, 178/DIG. 3
[51] Int. Cl. ............................................. H04n 1/32
[58] Field of Search ............ 178/6, DIG. 3, 7.1, 6.8, 178/5, 7.2, 6.6 P, 6.6 R, 7.6

[56] References Cited

UNITED STATES PATENTS

| | | | |
|---|---|---|---|
| 2,810,780 | 10/1957 | Loughlin | 178/5.2 |
| 2,824,904 | 2/1958 | Toulon | 178/DIG. 3 |
| 3,309,461 | 3/1967 | Deutsch | 178/DIG. 3 |
| 2,793,348 | 5/1957 | Hunter | 178/5.4 |
| 3,324,327 | 6/1967 | Cherry | 178/DIG. 3 |
| 2,921,124 | 1/1960 | Graham | 178/DIG. 3 |
| 3,141,926 | 7/1964 | Newell | 178/69.5 |

*Primary Examiner*—Howard W. Britton
*Assistant Examiner*—Michael A. Masinick

[57] ABSTRACT

A digital facsimile scanning system in which transitions in alternate lines are shifted by sub-multiple clock pulse intervals. The sampling time, i.e. the time for sampling either black or white information bits is staggered on every two or more sweeps, to reduce the occurence of clouded patterns and to give an appearance of increased resolution.

17 Claims, 11 Drawing Figures

INVENTOR.
STEPHEN E. TOWNSEND
BY Anthony D. Cennamo
Joseph J. Rosenthal

INVENTOR.
STEPHEN E. TOWNSEND
BY Anthony D. Cennamo
Joseph F. Rosenthal

INVENTOR.
STEPHEN E. TOWNSEND

BY Anthony D. Cennamo
Joseph F. Rosenthal

INVENTOR.
STEPHEN E. TOWNSEND

BY Anthony D. Cennamo
Joseph F. Rosenthal

INVENTOR.
STEPHEN E. TOWNSEND
BY Anthony D. Cennamo
Joseph J. Rosenthal

STAGGERED SCAN FACSIMILE

This is a continuation of application Ser. No. 423,061, filed Jan. 4, 1965, now abandoned.

This invention relates to systems for synchronized transmission of information, and more particularly to time and amplitude-quantized facsimile systems.

It is conventional in a facsimile system to employ a transmitter which scans an original document in some regular pattern of sequential lines and derives a video signal which is linearly related to the optical density of the elements of the original being scanned. This signal is transmitted to a remote receiver which scans a sheet of paper in synchronism with the transmitter and converts variations in the signal to variations in optical density, thus recreating the original document. This type of facsimile system will transmit any form of document, but is particularly useful for transmitting pictures. The resolution and fidelity of the image produced at the receiver depends on the characteristics of the transmitter and receiver and also on the frequency, phase distortion, and noise characteristics of the telephone line, radio channel or other transmission link used to connect the transmitter and receiver.

The transmission link is often by far the most expensive element in a facsimile system and the one which principally limits the speed and/or quality of transmission. A second type of facsimile system minimizes these limitations by sacrificing the capability of transmitting photographs or other continuous tone originals. In this type of facsimile system, the transmitter produces a signal which is limited to one of two discrete values, representative of black or white areas on the original document. The receiver makes corresponding black marks upon receiving a black signal. With this type of system, it is possible to transmit documents at a greater rate or at higher resolution and with fewer errors than with a system that retains continuous tone capabilities. In such a two-level system, the maximum number of black-white transitions for a given length of scan is fixed by the frequency response of the entire system, but each individual transition can take place at a more or less arbitrary time or place, subject only to extraneous electrical noise in the system. Accordingly, the receiver can accurately reproduce the location of black-white discontinuities in the original document and produce a copy which is a geometrically accurate reproduction of the original.

A third type of facsimile system is designed to make even more efficient use of the transmission link by quantizing the transmitted facsimile signal in time as well as in amplitude. In this system, facsimile signals corresponding to black-white or white-black transitions can be sent only at discrete time intervals. Normally, the transmitter includes a clock pulse generator which produces a train of pulses and the system is designed so that facsimile signals indicative of black-white or white-black transitions are sent only at times which coincide with clock pulses. Such facsimile signals are very similar to the signals employed in computers and other digital data processing apparatus. They can be reliably transmitted at high rates through a transmission link. They can be reliably regenerated in repeater amplifiers. They can be combined, as in digital computers, with parity signals to provide positive protection against errors in transmission. They can be coded in accordance with a predetermined scheme, transmitted in coded form, and accurately recreated at a receiving location. They can be used to reliably synchronize a transmitter and receiver. All of these benefits, as well as others, flow from the fact that the facsimile signals are time quantized as well as amplitude quantized. This type of facsimile system has accordingly many advantages for high speed, high quality or long distance transmission of black and white documents. It may also be referred to as a synchronous or clocked system.

The above system also has serious drawbacks which are the concern of this invention. In general, a time-quantized facsimile system can record just as many transitions per line as a system which is not time quantized but which uses the same type of transmission link and the same type of transmitter and receiver. However, the position of these transitions is no longer continuously variable. Furthermore, in any practical facsimile system, the resolution of the system is far less than the visual resolution of the person who must look at the reproduced document. Accordingly, a time-quantized facsimile system introduces positional errors into the reproduced copy which are painfully obvious to the viewer.

Normally, the random transition video from a facsimile scanner is sampled in accordance with the clock signal so that the transitions in the resulting clock or synchronized video occur at the same set of positions in each line. This video signal, when reproduced at a facsimile receiver, would have transitions that would always line up vertically and would be separated horizontally by multiples of one clock period. Transitions would never occur between these positions. This form of time quantization tends to reproduce vertical edges in a jagged and irregular fashion. This is disturbing when the edges are encountered in printing or the like and is equally disturbing when the edges are those of lines in an engineering drawing. These irregularities can be overcome by making the permissible transitions so close together that their spacing is barely perceptible to the eye, but either an increase in the bandwidth of the transmission link or a corresponding decrease in the rate at which documents can be transmitted is required. This solution is clearly contrary to the reason for adopting a time-quantized facsimile system.

In accordance with the present invention, markedly improved image quality is provided in a time and amplitude quantized facsimile system, without an increase in bandwidth or increase in document transmission time. This is accomplished by synchonizing the transitions in different lines of transmitted video to different clock signals having a common frequency but different phase. When reproduced at a facsimile receiver, these signals create marks which no longer line up in vertical rows and which give the impression of being far more numerous than is actually the case. It is accordingly a principal object of this invention to provide a synchronous facsimile method system and apparatus for producing copies in which black-white transitions are staggered or offset from line to line. Subsidiary objectives will become apparent from reading the more detailed description of the invention which follows.

Figures 4A, 4B:
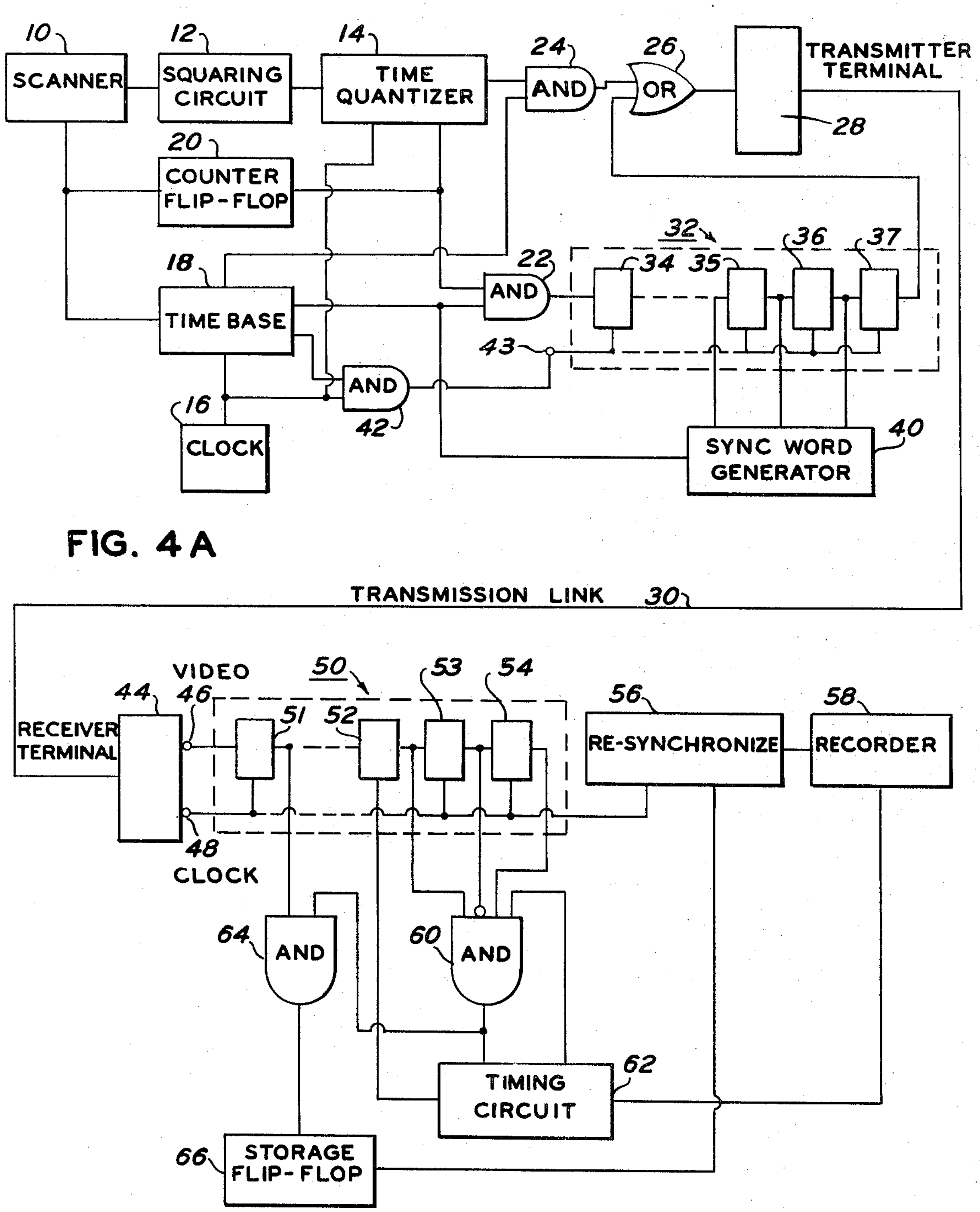
Figure 5:
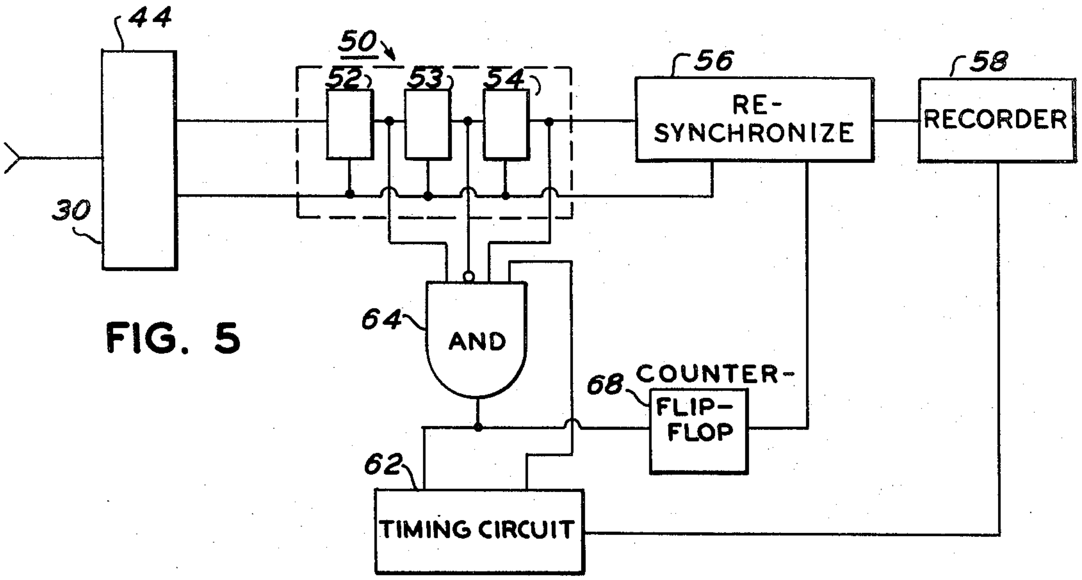
Figure 10:
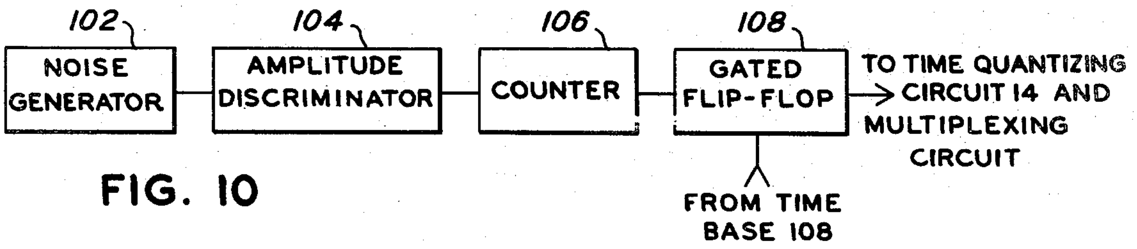
Figure 6:
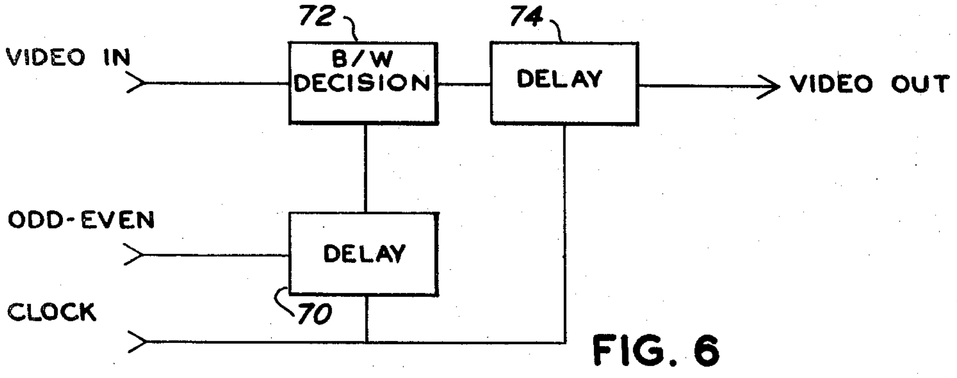
Figure 7:
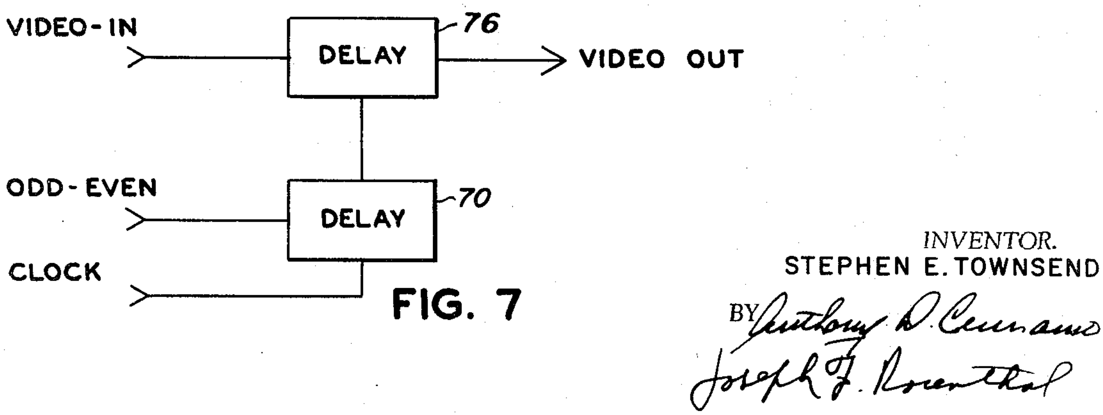
Figure 8:
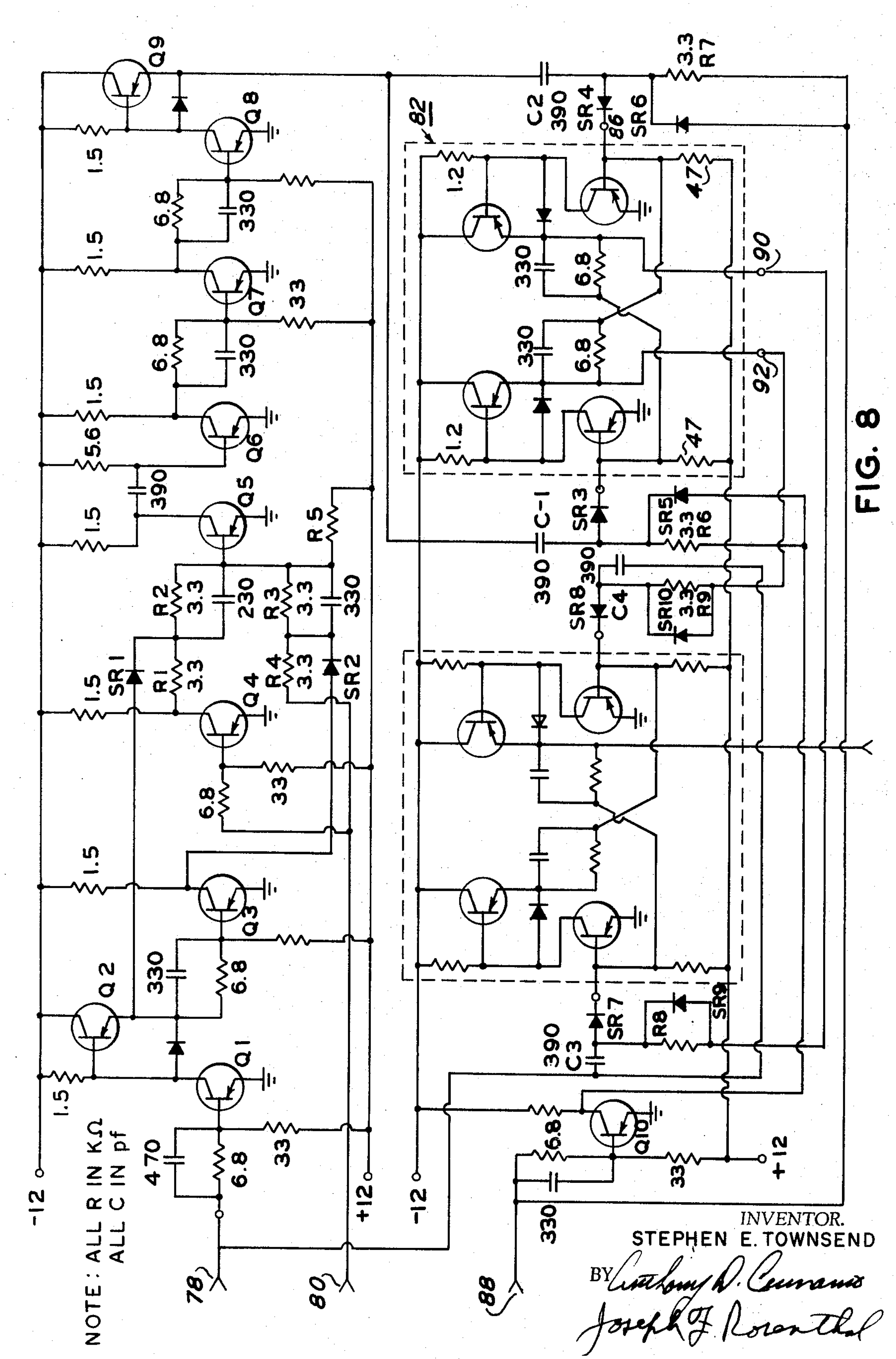
Figure 9:
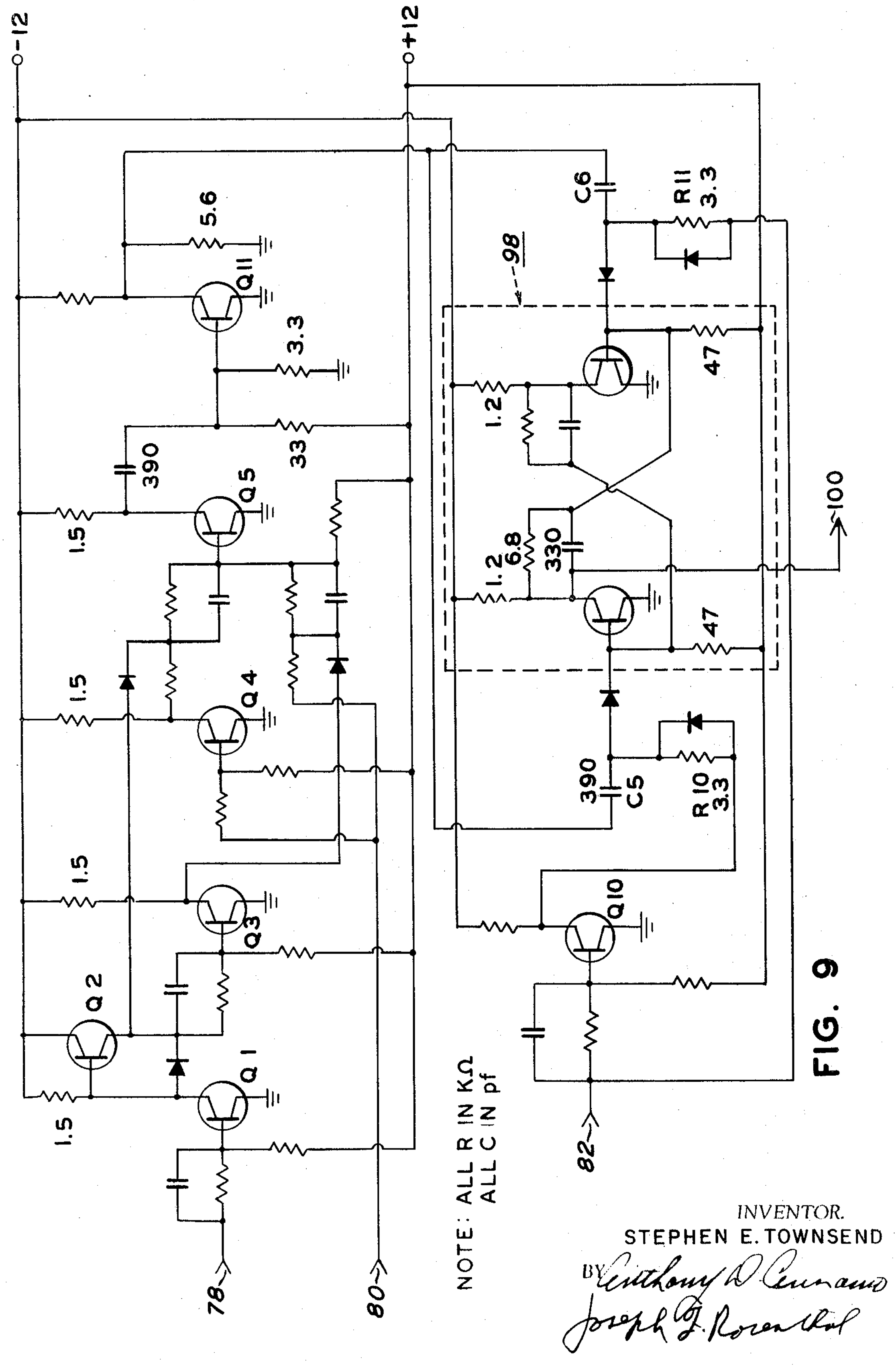

FIG. 4*a* is a block diagram of a facsimile transmitter;

FIG. 4*b* is a block diagram of a facsimile receiver;

FIG. 5 is a block diagram of a modified facsimile receiver;

FIG. 6 is a block diagram of a transmitter stagger circuit;

FIG. 7 is a block diagram of a receiver stagger circuit;

FIG. 8 is a schematic diagram of a transmitter stagger circuit;

FIG. 9 is a schematic circuit of a receiver stagger circuit; and,

FIG. 10 is a block diagram of a random stagger circuit.

Figure 1:
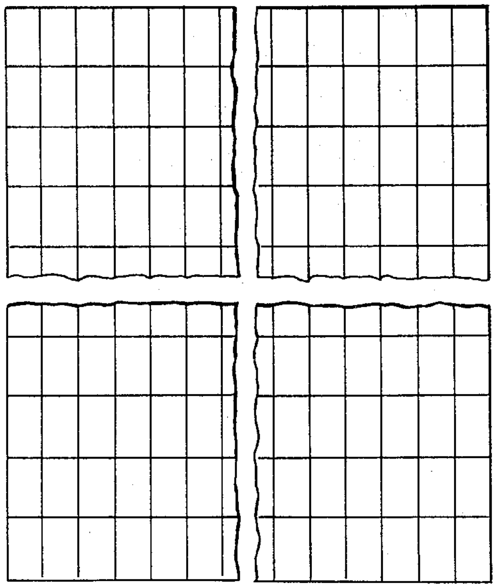
PRIOR ART FIG. 1
FIG. 1 represents a conventional facsimile scanning method.

FIG. 1 represents the conventional scanning pattern used in synchronous facsimile systems. Each rectangle represents an area of an original document which is transmitted as a single electrical signal and ultimately reproduced as the presence or absence of a single black mark. Ordinarily, these areas are scanned, transmitted, and reproduced in a regular sequence such as from left to right and top to bottom. The scanned and reproduced areas are not in general the neat rectangular areas shown in the drawing, but they are arranged in orderly rows and columns as shown. Also, the spacing between columns will ordinarily be of the same order as the spacing between rows. Typical facsimile systems employ from about 100 to 200 lines, or rows, per inch. An image is created from the pattern of FIG. 1 by blackening a pre-determined pattern of these rectangles.

Figure 2:
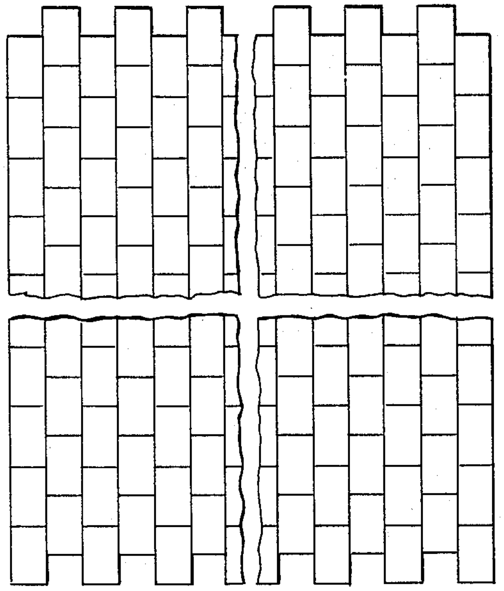
FIG. 2 represents a staggered scanning method in accordance with the invention.

FIG. 2 represents a preferred scanning pattern in accordance with the invention. Here, the scanned or reproduced areas are represented by rectangles having the same size and spacing as in FIG. 1. However, the rectangles in alternate lines are displaced by one half their width. This gives FIG. 2 a markedly different appearance from that of FIG. 1. More significantly, it gives to facsimile images prepared in this manner a far more pleasing and acceptable appearance with the impression of greatly enhanced resolution. The difference is so great as to make a time-quantized facsimile system according to FIG. 2 practically feasible, where it would be unacceptable using the scanning arrangement of FIG. 1.

Figure 3:
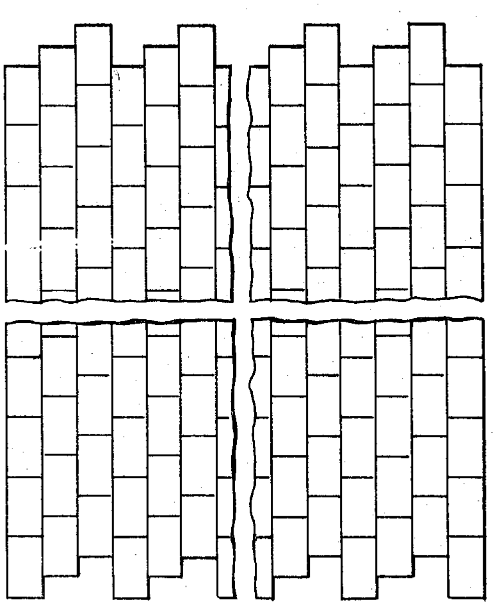
FIG. 3 represents a further scanning method in accordance with the invention.

FIG. 3 represents a different scanning arrangement where every third line is staggered or offset by a different amount. Other variations are possible in the number of steps of stagger which are employed and their disposition in successive lines. It is also possible in accordance with the invention to stagger successive lines in an essentially random fashion.

FIG. 4a is a block diagram of an illustrative facsimile transmitter capable of operating in accordance with the invention. A facsimile scanner 10 of any conventional type converts an original document or the like into a video waveform corresponding to successive lines of the document. The video is then applied to a squaring circuit 12 which converts the video to a two-level type of signal. Squaring circuit 12 may be a Schmitt trigger circuit or a high gain amplifier and limiter. The two-level video signal from squaring circuit 12 is then applied to a time-quantizing circuit 14 where it is converted to a time-quantized or synchronized signal in which all transitions are restricted to a pre-determined set of times. In the illustrated embodiment, the pre-determined times are those of the clock signals from a clock generator 16 which is connected to a stagger-quantizing circuit 14. In some instances, the clock signal may be supplied by equipment associated with the transmission link, rather than by the facsimile transmitter itself. Illustratively, clock signals may vary in frequency from about 250 kilocycles for use with the broadband commercial transmission service known as "Telpak C" to about two orders of magnitude lower for use with telephone circuits. The clock signals are also applied to a time base circuit 18 which generates various signals at suitable sub-multiples of the clock frequency for controlling various functions of the facsimile transmitter. One of these signals is a sync or blanking signal which is applied to scanner 10 to control the scanning frequency and timing. This signal is also applied to a counter flip flop circuit 20 which divides the blanking frequency in half and thus provides a two-level output signal which has different values for odd and even numbered sweeps of scanner 10 and which is applied to quantizing circuit 14 and also to an AND gate 22. Quantizing circuit 14 provides the stagger or offset feature of the invention in a manner which will be more fully described in connection with subsequent figures. The synchronized signal from circuit 14 is applied to one input of an AND gate 24, the other input of which is connected to time base 18. The signal from time base 18 is applied to AND gate 24 during the generation of video signals, but is absent during periodic retrace of blanking intervals in which video information is not transmitted. During these intervals, gate 24 is closed. The output of gate 24 passes through an OR gate 26 to a transmitting terminal 28 where it is suitably coded, modulated and the like and transmitted over a communication link 30 which may be a telephone line, a coaxial cable, a common carrier microwave channel or the like. The transmitter terminal is generally part of the transmission link, is generally furnished by the owner of the link, and forms no part of the present invention.

The facsimile transmitter also includes a shift register 32 for sending synchronizing signals during the blanking or retrace periods. Three register stages, 35, 36 and 37, are shown for this purpose although many more would actually be used. These register stages are connected to a sync word generator 40 which loads a fixed pre-determined digital word into register stages 35, 36 and 37 upon receipt of a command signal from time base 18. This command signal is also applied to AND gate 22, the output of which is connected to a final register stage 34. Accordingly, the output of counter 20, representative of an odd or even numbered sweep, is loaded into register stage 34 at the same time that the fixed sync word is loaded into stages 35, 36 and 37. The shift register shift input 43 is connected to the output of an AND gate 42, the inputs of which are connected to time base 18 and clock generator 16. Time base 18 applies a signal during the blanking or retrace periods which permits clock pulses to pass through gate 42 to the shift input 43 of shift register 32, causing the contents of register 32 to be unloaded through OR gate 26 at the basic clock rate and to be applied to transmitter terminal 28 for transmission over communication link 30. Shift register 32 is unloaded while AND gate 24 is closed. The signal appearing at the output of OR gate 26 is a synchronous facsimile signal multiplexed with synchronizing or other control information as well as with a signal which indicates the odd or even character of each individual facsimile line. The signal may be transmitted as shown or recorded on a tape recorder for later transmission or printing.

FIG. 4b shows a facsimile receiver for use with the transmitter of FIG. 4a. Communication link 30 terminates in a receiver terminal 44 which is ordinarily furnished by the owner of the communication link. Terminal 44 ordinarily provides a received video signal at an output 46 and regenerated clock signals at an output 48. The video signal is stepped through a shift register 50 by the application thereto of clock signals from output terminal 48. The video signals emerging from shift register 50 are applied to a resynchronizing or stagger circuit 56 where they are re-timed for application to recorder 58, which may be any conventional facsimile recorder. Shift register stages 52, 53 and 54 are connected to appropriate lengths of an AND circuit or coincidence detector 60 which produces an output signal to the receiver timing circuit 62 whenever the predetermined sync word appears at the appropriate indicated position in shift register 50. Whenever the sync word is detected at registers 52, 53 and 54, the output of register stage 51 will indicate the odd or even character of the line being received. This can be understood from the general correspondence of receiver shift register 50 with transmitter shift register 32 and, more particularly, in view of the correspondence of receiver register stage 52 with transmitter register stage 34. The output of register 51 is applied to an AND circuit 64, the other input of which is connected to the output of AND circuit 60. The output of AND circuit 64 is connected to a storage flip flop 66. Thus, upon detection of a sync word, the output of register stage 51 is passed to flip flop 66, the output of which remains constant until the next sync word and indicates the odd or even character of the line being recorded. The odd-even signal from flip flop 66 is applied to resynchronizing circuit 56, as are the clock signals. Timing circuit 62 generates, in response to clock signals and received sync words, appropriate timing or blanking signals which are applied to recorder 58 to effect synchronization with scanner 10 in the facsimile transmitter. Timing circuit 62 may also provide, as shown, a return signal to AND gate 60 to enable the gate only during clock intervals when a sync word is anticipated.

In the specific embodiment of FIGS. 4*a* and 4*b*, the video signal is treated in one of two possible ways at the transmitter and receiver, depending upon whether a particular line is characterized as odd or even. Since odd and even lines necessarily alternate, it is possible in some instances to simplify the embodiment of FIGS. 4*a* and 4*b* by eliminating shift register stage 34 and associated components from FIG. 4a and substituting the circuit of FIG. 5 for that of FIG. 4b. Since the transmitter is no longer adapted to transmit a signal to identify the odd or even character of each line, means must be provided at the receiver to synthesize this information. In the circuit of FIG. 5, shift register stage 51 and associated components are eliminated but a frequency divider flip flop 68 is connected between the output of AND circuit 60 and resynchronizer circuit 56. Accordingly, circuit 56 will process the video signal in different manner for alternating lines. If flip flop 68 is initially adjusted to provide the correct output for a particular line, it will continue to do so thereafter.

FIG. 6 is a more detailed block diagram of circuit 14 of FIG. 4*a*. The clock signal is passed through a variable phase shifter or delay circuit 70 to a black-white decision circuit 72 which is also connected to the incoming two-level unsynchronized video signal. Delay circuit 70 provides to decision circuit 72 a phase shifted clock signal, the phase of which is determined by the received odd-even command signal. The black-white decision circuit provides a two-level output signal which remains constant between clock signals and has transitions only at clock signals. Different forms of decision circuits are known as well as different logical schemes for making the decision. The simplest form of circuit, which will be used for illustrative purposes, is a flip flop circuit which is connected to the incoming video and which is inhibited from changing state except at the instant when a clock signal is received. On receipt of a clock signal, the flip flop conforms its state to that of the incoming video and remains in that state at least until the next clock signal. Since the clock signals applied to decision circuit 72 have different phases during different lines, the synchronized video from circuit 72 corresponds to sampling positions which are effectively staggered from line to line in accordance with the basic purpose of the present invention. Where the transmission link consists merely of a length of wire or coaxial cable, the signal from circuit 72 may be directly suitable for transmission. However, the signal changes in phase from line to line and such a signal is not suitable for transmission over most types of communication links wherein the signal passes through repeaters or the like in which it is regenerated and resynchronized to a clock signal of constant frequency and phase. For this reason, the signal from circuit 72 is preferably passed through a variable delay circuit 74 wherein the phase of the signals from circuit 72 is altered as necessary to bring them back into synchronism with the clock signals from clock generator 16. As with circuit 72, a gated flip flop circuit represents one way of carrying out the required function of the circuit. The output of resynchronizer circuit 74 is a two-level video signal having transitions synchronized with a stable clock, but representing sampling times or sampling positions which are staggered or offset from the line-to-line of the scanning pattern embodied in scanner 10.

FIG. 7 represents a detailed block diagram of resynchronizing circuit 56 of FIG. 4*b*. The regenerated receiver clock signals are passed through a phase shifter or delay circuit 70 which may be identical with that of FIG. 6. Circuit 70 alters the phase of the clock signals in a manner complimentary to that performed in FIG. 6, in response to similar odd-even command signals. The received video signals from shift register 50 are applied to a delay circuit 76 which delays them in accordance with the phase of the clock signals. Delay circuit 76 may be identical with circuit 74 of FIG. 6. That is, it may constitute a gated flip flop which is enabled to make a transition to a state determined by the incoming video only at the instant when a phase shifted or delayed clock signal arrives. The signal emerging from delay circuit 76 is a replica of the signal produced by circuit 72 of FIG. 6. When applied to a facsimile recorder, it will create a pattern of marks which are representative of an original document but which are staggered instead of being aligned in vertical rows.

FIG. 8 is a schematic diagram of one embodiment of a time-quantizing stagger circuit as shown in FIG. 4a or FIG. 6. A master clock signal is received at terminal 78 from an external source. Illustratively, the clock signal is a square wave having amplitudes of 0 and −12 volts. The master clock signal is inverted in an amplifier consisting of transistors Q1 and Q2 and is again inverted by transistor Q3. The odd-even command signal, having values of 0 and −12 volts, is received at terminal 80 and applied to one end of resistor R4. The other end of resistor R4 is connected through diode SR2 to transistor Q3. Resistor R4 and diode SR2 comprise a form of AND gate in that their junction will go negative if and only if each of the odd-even command and the collector of Q3 is at −12 volts. Resistor R1 and diode SR1 comprise a similar AND gate except that R1 is connected to Q4 which inverts the odd-even command signal, and SR1 is connected to Q1 and Q2. If the odd-even command signal is at 0 volts, the junction of R4 and SR2 cannot go negative, but the junction of R1 and SR1 can go negative when and only when the clock signal from Q1 is negative. If the odd-even command signal is at −12 volts, the junction of R1 and SR1 cannot go negative, but the junction of R4 and and SR2 can go negative when and only when the clock signal from Q3 is negative. The clock signal from Q3 is 180° out of phase from that of Q1.

The junction of R1 and SR1 is connected to the base of transistor Q5 by resistor R2 and the junction of R4 and SR2 is connected to the base of Q5 by resistor R3. A resistor R5 is connected between the base of Q5 and the +12 volt supply. R2, R3 and R5 constitute an OR gate in that transistor Q5 will turn on if either the junction of R1 and SR1 or the junction of R4 and SR2 goes negative. Accordingly, the state of transistor Q5 is controlled by transistor Q3 when the odd-even command signal is −12 volts, and is controlled by transistors Q1 and Q2 when the command signal is 0 volts. Since the output of Q3 is 180° out of phase from that of Q1 and Q2, the phase of transistor Q5 can be advanced or retarded by one-half cycle in response to the odd-even command signal at terminal 80. The output of transistor Q5 is capacitively coupled to transistor Q6 which is normally biased on. The coupling time constants may be chosen so that Q6 only remains off for about 1 microsecond each time Q5 turns on. The negative pulse output from transistor Q6 is squared in two successive inverting amplifier stages consisting of Q7 and of Q8 and Q9 and the resulting one microsecond negative pulse is applied to a flip flop circuit 82 in a manner which will be described. These short pulses are not essential to the operation of the illustrated circuit, since square waves derived from transistors Q5 would also be suitable. The illustrated one microsecond pulses are, however, suitable for use in the present invention and are useful for other purposes in a facsimile transmitter, as described for example in copending application Ser. No. 415,318, filed Dec. 2, 1964, now U.S. Pat. No. 3,402,263, entitled, "Facsimile Decision Circuit."

The negative pulses from transistors Q8 and Q9 are applied to capacitors C1 and C2 which are coupled through diodes SR3 and SR4 to terminals 84 and 86 of flip flop circuit 82. Video signals received at terminal 88 are applied through a resistor R7 to the junction of capacitors C2 and diode SR4. A diode SR6 is preferably placed in parallel with resistor R7 to increase the switching speed of the circuit. The video signal, which has levels of 0 and −12 volts, is also inverted by a transistor Q10 and applied through a resistor R6 to the junction of capacitor C1 and diode SR3. A diode SR5 is preferably in parallel with R6. If the video signal is at 0 volts, then the application of a positive signal to capacitor C2, as represented by the trailing edge of the one microsecond negative pulses, will cause flip flop 82 to switch to the state in which output terminal 92 is at 0 volts. Pulses applied to capacitor C1 will have no effect since the voltage applied to R6 is −12 volts due to the inverting action of transistor Q10. If the video signal is at the −12 volt state, then the output of transistor Q10 is at 0 volts and the trailing edge of the one microsecond pulse applied to capacitor C1 will cause flip flop 82 to assume the state in which output terminal 90 is at 0 volts. Accordingly, the outputs of flip flop 82 assume a state which is determined by the state of the video signal at the instant of the trailing edge of the pulses applied simultaneously to capacitors C1 and C2, and retain that state at least until the next appearance of the pulses from Q8 and Q9. Flip flop 82 can alter its state only when enabled by the pulses from Q8 and Q9. Accordingly, the output of flip flop 82 represents a time-quantized facsimile signal as determined by sampling times or locations which are staggered or offset from line to line in response to the signal received at terminal 80.

The output of flip flop 82 is not locked in phase to the master clock signal as received at terminal 78. As described previously, this type of signal is useful in a synchronous facsimile system only in certain limited circumstance. Accordingly, outputs 90 and 92 of flip flop 82 are connected through resistors R8 and R10 to a flip flop 94 which may be identical with flip flop 82. Capacitors C3 and C4 of flip flop 94 correspond to capacitors C1 and C2 of flip flop 82, but are connected directly to the master clock signal as received at terminal 78. Accordingly, flip flop 94 will assume the state of flip flop 82 only when enabled by a positive-going edge of the clock signal. Output 96 of flip flop 94 incorporates all the transitions of flip flop 82 but is in synchronism with the clock signal, irrespective of the state of the odd-even command signal at terminal 80. Terminal 96 provides a facsimile output signal which is completely compatible with conventional digital transmission links but which incorporate the staggered or offset scanning feature of the invention.

FIG. 9 is a schematic diagram of a resynchronizing circuit as shown in FIG. 4*b* or FIG. 7. Clock pulses are received at terminal 78 and odd-even command signals are received at terminal 80 as in FIG. 8. Transistors Q1 through Q5 and associated circuitry are exactly the same as in FIG. 8 and generate a delayed or phase shifted clock signal in exactly the same manner. The variable phase clock signal appearing at transistor Q5 is capacitively coupled to a transistor Q11 which is normally biased off. The resulting output signal from Q11 is a positive pulse which is applied to capacitors C5 and C6 associated with a gated flip flop 98. Although the illustrated internal construction of flip flop 98 differs slightly from that of flip flops 82 or 94 of FIG. 8, it operates in exactly the same way and is essentially interchangeable with them. As in FIG. 8, a positive pulse applied to capacitors C5 and C6 enables the flip flop to change state, while the flip flop is inhibited at all other times. Since a positive pulse is applied in this instance, it is the leading edge of the pulse which is effective. The video signals from the facsimile receiver shift register are received at terminal 88 and inverted by transistor Q10 exactly as in FIG. 8. The direct and inverted video signals are applied to flip flop 98 through resistors R11 and R10 respectively. Flip flop 98 can switch to a state determined by the video signal at input 88 only when enabled by a phase shifted clock pulse applied to capacitors C5 and C6. Output terminal 100 of flip flop 98 accordingly is a digital synchronous video signal which has been delayed under the control of the odd-even command signal to correspond in phase with the output of flip flop 82 of FIG. 8. Accordingly, application of the signal from terminal 100 to a facsimile recorder will create a facsimile of the document originally scanned by facsimile scanner 10 in accordance with the stagger or offset principles of the invention.

The circuits shown in FIGS. 4 through 9 illustrate a facsimile system in which the transitions in alternate lines are offset by half the normal spacing between transitions. This represents one preferred embodiment but many others are possible as well as desirable. The amount of offset between individual lines can be adjusted to any desired value by phase shifting or delaying the clock signals by the desired corresponding amounts in the facsimile transmitter and receiver. Any conventional form of phase shift or time delay circuits can be used just as readily as the particular illustrated phase shift circuitry. Furthermore, the invention need not be limited to two different scanning phases or positions. In FIG. 3, there has already been illustrated a further scheme in which only every third line is vertically aligned rather than every second. Further variations of this type are possible. To implement such a further embodiment of the invention, it is necessary only to replace counter 20 of FIG. 4*a* with a counter which divides by 2, 3, 4 or some other number rather than 2. Ring counters or cascaded binary counters may be used. The time-quantizing circuit 14 should be adapted to provide a different predetermined amount of clock signal phase shift in response to each different counter output signal. This can be accomplished in various ways including the use of a set of different phase shift circuits operating in parallel through a set of gates, such that only a singla gate is open single a time as determined by the counter output signal. Also, shift register stage 34 will be supplemented by additional stages to transmit additional control pulses indicative of the offset or phase shift associated with a particular line being scanned. The necessary number of shift register stages is determined by the well-known relation that the number of different conditions which can be identified by $n$ register stages is $2^n$. Similar modifications can be made in the receiving circuitry of FIG. 4b. Additional shift register stages will be added to identify the longer control signals from the transmitter, and resynchronizer circuit 56 can readily be modified to accommodate more than two different amounts of phase shift. Alternatively, the circuit of FIG. 5 can be adapted by modifying counter flip flop 68 with a counter which counts by a factor of three or some larger number and by making the corresponding changes in resynchronizing circuit 56.

In a further embodiment of the invention, a predetermined scanning scheme is not employed, but instead, the transitions in individual lines are positioned in a random fashion. FIG. 10 shows one way in which this can be accomplished. A noise generator 102 provides a source of random noise signals which are passed through an amplitude discriminator 104 which passes noise pulses above a threshold which is chosen to provide a suitable rate of random noise pulses to counter 106. Counter 106 counts by a factor of 2 or some larger number and may comprise a ring counter, a binary counter, a set of cascaded binary counters, or the like. The counter ouput is applied to one or more gated flip flops 108 which function as a register and are periodically enabled by the blanking signal or other suitable signal from time base circuit 18 of FIG. 4*a*. The flip flops assume a state determined by the count output of counter 106 at that particular instant and provide a fixed output for the remainder of the facsimile scan line. The number of output levels available from flip flops 108 is determined by the construction of the flip flops and of counter 106, but the particular output level for each scan line is completely random and unpredictable. The output signals from flip flops 108 are used to control a time-quantizing circuit 14 to provide a different amount of time delay or offset corresponding to each output level and are also connected to appropriate shift registers 32 or other multiplexing circuits to provide a transmitted signal for each scan line which is indicative of the offset of that line. No particular changes are required to enable a facsimile receiver as previously described to work with this mode of transmisison, except that the circuit of FIG. 5 is clearly unsuitable.

It will be appreciated that the block diagrams and circuitry, as previously described, are for illustrative purposes only. Alternative means are known to accomplish the logical functions inherent in the described apparatus and such alternatives may be employed within the spirit of the invention. Furthermore, it will be realized that the method and apparatus of the present invention are not limited in usefulness to the direct transmission and recording of facsimile signals. Facsimile signals generated in accordance with the invention may be recorded on a tape recorder or the like either before or after transmission and may be played back into a facsimile recorder at some later time. Also, the synchronous, digital nature of the facsimile signals employed in this invention makes it possible for the signals to be encoded in accordance with some bandwidth compression or other scheme and subsequently to be decoded back to their original form for application to a facsimile receiver of the type described herein. Facsimile signals are not the only type which may be processed in accordance with the invention, as digital television signals and non-visual signals may be similarly processed in similar apparatus and are intended to be included in the term "facsimile" as used in the claims.

The invention is also directly applicable to amplitude-quantized systems in which amplitude is quantized in three or more steps, instead of the two steps or levels described for illustrative purposes. Such multi-level signals may or may not be recoded in two-level or other form for transmission. Also, the amount of stagger may be changed within a facsimile or television scan line, if desired, without departing from the spirit of the invention and without substantially modifying the described apparatus.

Where stagger command signals are transmitted, they may be multiplexed with the video signals by methods other than the illustrated time-division method, or may be sent over a separate control channel. It will also be understood that reference to signal levels or amplitudes does not imply particular electrical voltages or the like, since signal levels can be represented by many different attributes. Furthermore, it will be understood that staggered time-quantized signals can be generated by stepwise operation of a scanner under control of a stagger command signal, rather than by subsequent electronic manipulations performed on the output of a conventional continuous scanner, as illustrated. Similarly, stagger can be introduced into a transmitter or receiver by altering the phase of the scanner or recorder sweeps with respect to the clock reference, rather than by rigidly synchronizing the sweeps to the clock reference and altering the phase of the signal derived from or supplied thereto, as is done in the illustrated embodiments. Thus, the time delay circuit 70 of FIGS. 6 and 7 could be introduced between time base 18 and scanner 10 of the transmitter of FIG. 4*a* and/or between timing circuit 62 and recorder 58 of the receiver of FIG. 4b to delay the scanner or recorder sweeps by a variable amount.

Accordingly, there is no intent to limit the invention except in accordance with the following claims.

What is claimed is:

1. The method of transmitting visual information comprising forming a signal by serially sampling an attribute of an original image at a sequence of uniformly spaced sampling positions disposed in lines, and staggering said sampling positions from line to line, while retaining the serial relationship of said samples.

2. The method of transmitting visual information comprising forming a signal by sampling an attribute of an original image line by line in serial relationship and at a sequence of uniformly spaced sampling positions per line, staggering said sampling positions from line to line, preserving the serial relationship of said samples, and converting said signal into a pattern of markings corresponding to said original image, said markings being disposed in positions corresponding to said sampling positions.

3. The method of transmitting visual information comprising forming a signal by serially sampling an attribute of an original image at a sequence of uniformly spaced sampling positions disposed in a predetermined order in lines, said positions being staggered from line to line, serially transmitting said samples in said order together with a second signal indicative of the degree of stagger, serially converting said samples into a pattern of markings disposed in lines at uniformly spaced positions, and longitudinally shifting the positions of said lines in response to said second signal.

4. A facsimile transmitter including,
- image scanning means for serially sampling an image attribute at a succession of discrete areas uniformly spaced apart and arranged in a predetermined order in scan lines,
- means for generating a series of image representing video signals in response to and in the order of said samples,
- means to generate a stagger command signal which differs for successive scan lines,
- and means to vary the longitudinal position of said scan lines in response to said command signals.

5. The transmitter of claim 4 further including means to transmit said video signals at fixed intervals and at fixed phase.

6. The transmitter of claim 5 further including means to transmit said command signals.

7. An image transmitter including
- a line scanner synchronized to a sub-multiple of a periodic clock signal having a fixed rate,
- means to generate a two-level asynchronous signal from said scanner, representative of immediately adjacent and successive scan lines,
- means to generate an odd-even command signal which has one value for even-numbered scans and another value for odd-numbered numbered scans,
- means to sample said asynchronous signal at said clock rate to generate a synchronous signal having transitions restricted to times spaced at the rate of said clock signal,
- and means to vary the phase of said sampling times by one-half the period of said clock signal in response to said command signal.

8. The transmitter of claim 7 further including means to resynchronize said transitions into a fixed phase relation with said clock signal.

9. The transmitter of claim 8 further including means to time division multiplex said odd-even command signal with said resynchronized signal.

10. An image transmitter including,
- a scanner synchronized to sub-multiple of a periodic clock signal having a fixed rate,
- means to generate a multiple level amplitude quantized asynchronous signal from said scanner,
- means to generate a multiple level command signal which varies from scan line to scan line in a predetermined fashion,
- means to sample said asynchronous signal at said clock rate to generate a synchronous signal having transitions restricted to times spaced at the rate of said clock signal,
- and means to vary the phase of said sampling times in response to said command signal, said sampling times being staggered from line to line.

11. An image receiver including,
- an image signal recorder,
- means to receive a synchronous video signal serially corresponding to immediately adjacent and successively sampled scan lines having staggered sampling positions,
- means to synchronize said recorder to said scan lines,
- means to alter the phase of said video signals between scan lines to compensate for said staggered sampling positions,
- and means to apply said phase altered video signals to said video recorder.

12. An image receiver including,
- a scanning image recorder,
- means to synchronize successive scans of said recorder to a sub-multiple of a clock signal,
- means to receive a video signal synchronized with said clock signal and serially corresponding to successive samples from immediately adjacent scan lines having staggered sampling positions,
- means to alter the phase of said video signal with respect to said clock signal between scans to compensate for the stagger of said sampling positions,
- and means to apply said phase altered video signal to said recorder.

13. The receiver of claim 12 in which said phase altering means alters the phase of said video signal with respect to said clock signal in a predetermined repetitive pattern which is staggered from line to line.

14. An image receiver including,
a scanning image recorder,
means to receive a periodic clock signal,
means to receive a video signal synchronous with said clock signal and containing multiplexed synchronizing and command signals,
means to demultiplex said synchronizing signals for operating said scanning image recorder in accordance therewith,
means to demultiplex said command signals,
means to alter the phase of said video signal with respect to said clock signal in response to said command signals,
and means to apply said phase altered video signal to said image recorder.

15. An image receiver including,
a scanning image recorder,
means to receive a periodic clock signal,
means to receive a video signal synchronous with said clock signal and containing periodic time-multiplexed control signals,
said control signals comprising synchronizing signals and command signals,
means to demultiplex said synchronizing signals for operating said recorder in accordance therewith,
means to demultiplex said command signals,
storage means to store said command signals between said control signals,
means responsive to said stored command signals to alter the phase of said video signals with respect to said clock signal,
and means to apply said phase altered video signals to said image recorder.

16. An image receiver including,
an image recorder,
means to receive a periodic clock signal,
means to receive a video signal synchronous with said clock signal and containing periodic time-multiplexed control signals,
said control signals comprising synchronizing signals and two-level command signals,
means to demultiplex said synchronizing signals for operating said image recorder in accordance therewith,
means to demultiplex said command signals,
means to store said command signals between said control signals,
means responsive to said stored command signals to alter the phase of said video signal with respect to said clock signal by one-half the period of said clock signal,
and means to apply said phase altered video signal to said image recorder.

17. A visual communication system comprising,
transmitter image scanner means for generating a series of discrete video signals corresponding to an image attribute sampled at a succession of discrete areas uniformly spaced apart and arranged in transmitter scan lines,
means to generate a staggered command signal which differs for successive scan lines,
means to vary the longitudinal position of said transmitter scan lines in response to said command signals,
means to transfer said video signals at fixed phase to a receiver,
means to transfer said command signals to said receiver,
scanning means at said receiver responsive to said transferred video signals to generate a series of visual signals corresponding to an image attribute at a succession of discrete areas uniformly spaced apart and arranged in receiver scan lines,
and means to vary the longitudinal position of said receiver scan lines in response to said transferred command signals.

* * * * *